US007127079B2

(12) United States Patent
Keating et al.

(10) Patent No.: US 7,127,079 B2
(45) Date of Patent: Oct. 24, 2006

(54) IMAGE PROCESSING APPARATUS

(75) Inventors: Stephen Mark Keating, Reading (GB); Daniel Warren Tapson, Basingstoke (GB); Jason Charles Pelly, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 695 days.

(21) Appl. No.: 10/006,051

(22) Filed: Dec. 6, 2001

(65) Prior Publication Data
US 2002/0141611 A1 Oct. 3, 2002

(30) Foreign Application Priority Data
Dec. 7, 2000 (GB) ................................. 0029866.1

(51) Int. Cl.
*G06K 9/00* (2006.01)

(52) U.S. Cl. ...................................... 382/100; 713/176
(58) Field of Classification Search ................ 380/210, 380/252, 287, 54; 382/100, 232; 713/176; 704/200.1, 273; 381/73.1; 348/460, 463
See application file for complete search history.

(56) References Cited

U.S. PATENT DOCUMENTS 5,915,027 A * 6/1999 Cox et al. ...................... 380/54

(Continued)

FOREIGN PATENT DOCUMENTS

EP 0967783 12/1999

(Continued)

OTHER PUBLICATIONS

Patent Abstracts of Japan, JP 2000 101828 Apr. 7, 2000.

(Continued)

*Primary Examiner*—Vikkram Bali
*Assistant Examiner*—Anand Bhatnagar
(74) *Attorney, Agent, or Firm*—Oblon, Spivak, McClelland, Maier & Neustadt, P.C.

(57) ABSTRACT

An image processing apparatus is operable to embed data into an image. The apparatus comprises a combining processor operable to introduce the data into a transform domain representation providing a plurality of sub-bands divided by spatial frequency components, and, in combination with a transform processor, to combine the data with the image in one of a transform domain form, the transform processor generating a transform domain form of the image, the data being combined with the image by the combining processor in the transform domain, and the transform processor generating a spatial domain representation of the combined image and data, or a spatial domain form of the image, the transform processor generating a spatial domain representation of the transform domain data, the data being combined with the image by the combining processor in the spatial domain. The data is introduce into at least one of the sub-bands in a scan direction, the sub-band representing in the transform domain low spatial frequencies of the image in one direction and high spatial frequencies of the image in another direction, the scan direction being in the same direction in the sub-band as the direction of the low spatial frequencies of the image. Since the low spatial frequencies of the image correspond to the lower energy transform domain components of the image, embedding the data in the same direction as the lower spatial frequencies provides an improved likelihood of correctly detecting the embedded data and correspondingly as a result of the improved detection likelihood, the energy of the embedded data signal can be reduced, thereby reducing any possible visual impairments to the image in the spatial domain.

28 Claims, 6 Drawing Sheets

U.S. PATENT DOCUMENTS

| | | |
|---|---|---|
| 6,208,735 B1 * | 3/2001 | Cox et al. .................... 380/54 |
| 6,332,030 B1 * | 12/2001 | Manjunath et al. ......... 382/100 |
| 6,385,329 B1 * | 5/2002 | Sharma et al. .............. 382/100 |
| 6,683,966 B1 * | 1/2004 | Tian et al. .................. 382/100 |

FOREIGN PATENT DOCUMENTS

| | | |
|---|---|---|
| EP | 1030511 | 8/2000 |
| FR | 2 782 223 | 2/2000 |
| FR | 2 782 224 | 2/2000 |
| FR | 2 785 426 | 5/2000 |

OTHER PUBLICATIONS

INSPEC Abstract Accession No. 6821548 Pereira et al. (Apr. 2000).

C. Valens, "*A Really Friendly Guide to Wavelets*", 1999 (c. valens@mindless.com).

SMPTE Journal, *Proposed SMPTE Standard for Television—Unique Material Identifier (UMID)*, Mar. 2000, pp. 221-225.

\* cited by examiner

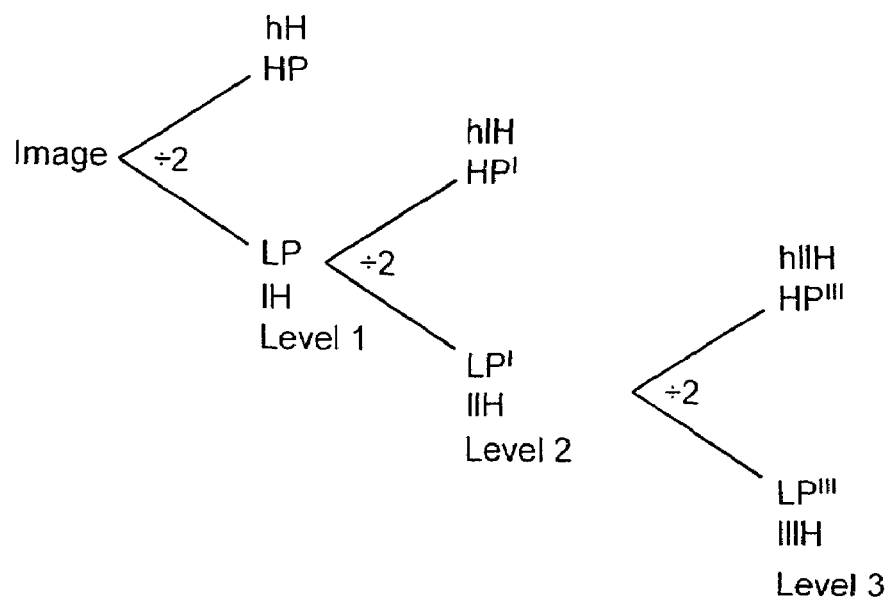
FIG. 3  Schematic of Wavelet Transform
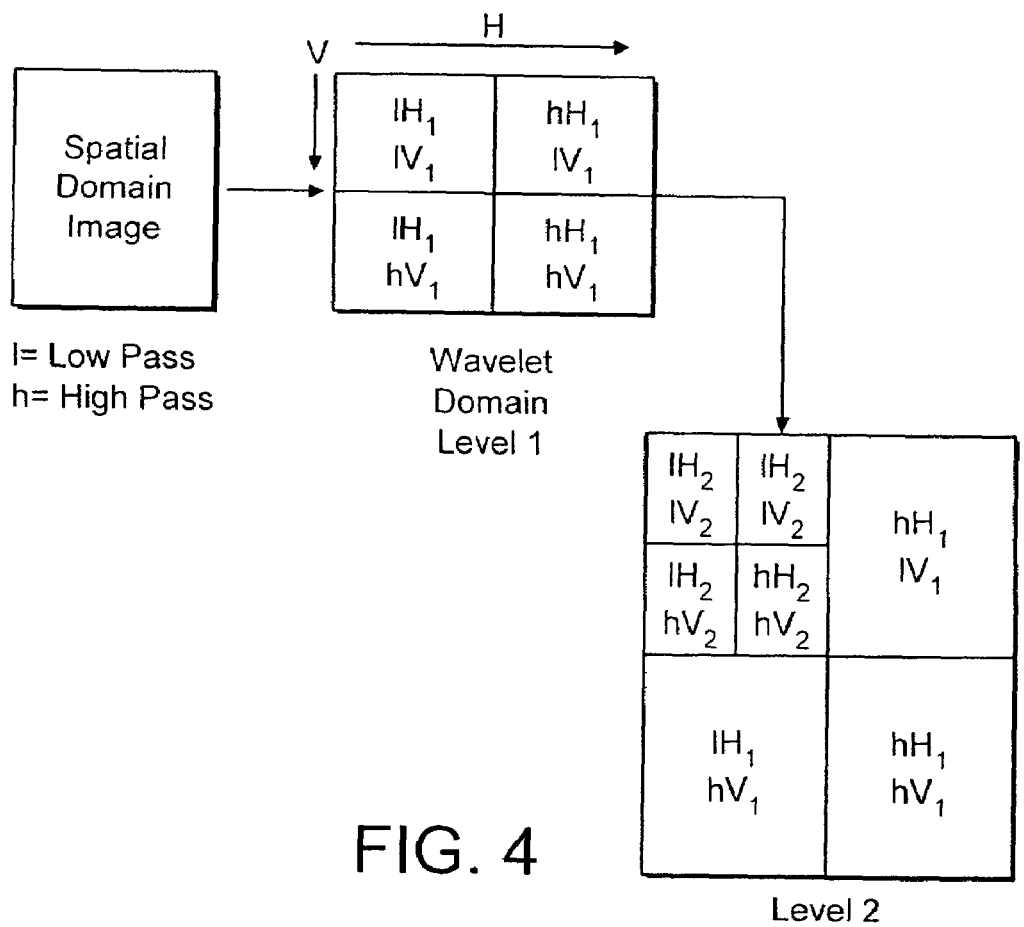
FIG. 4

BASIC AND EXTENDED UMID STRUCTURES

IMAGE PROCESSING APPARATUS

FIELD OF INVENTION

The present invention relates to image processing apparatus operable to embed data into images.

BACKGROUND OF INVENTION

Steganography is a technical field relating to the embedding of data into material such as video material, audio material and data material in such a way that the data is imperceptible in the material.

Watermarks are data embedded in material such as video material, audio material and data material. A watermark may be imperceptible or perceptible in the material.

A watermark may be used for various purposes. It is known to use watermarks for the purpose of protecting the material against, or trace, infringement of the intellectual property rights of the owner(s) of the material. For example a watermark may identify the owner of the material.

Watermarks may be "robust" in that they are difficult to remove from the material. Robust watermarks are useful to trace the provenance of material which is processed in some way either in an attempt to remove the mark or to effect legitimate processing such as video editing or compression for storage and/or transmission. Watermarks may be "fragile" in that they are easily damaged by processing which is useful to detect attempts to remove the mark or process the material.

Visible watermarks are useful to allow, for example, a customer to view an image via, for example, the Internet to determine whether they wish to buy it but without allowing the customer access to the unmarked image they would buy. The watermark degrades the image and the mark is preferably not removable by the customer. Visible watermarks are also used to determine the provenance of the material into which they are embedded.

It has been proposed to embed data into material information, such as images, to form a watermark, by converting the material into a transform domain and adding the data to the image in the transform domain. For the example of video images, the Discrete Wavelet Transform of these images into the transform domain, provides a form of the image in which the data can be embedded. The data to be embedded can be combined with the wavelet coefficients of one of a plurality of sub-bands which are formed in the transform domain. Generally, the data to be embedded is arranged to modulate a predetermined data sequence such as a Pseudo Random Bit Sequence (PRBS). For example, each bit of the data to be embedded is arranged to modulate a copy of the PRBS, and this copy is then added into one of the sub-bands of the image in the transform domain. The image is then converted back to the spatial domain.

Generally it is desirable in any steganographic scheme to reduce the effect of the embedded data on the material information in which the data is embedded, whilst as far as possible increasing the likelihood of correctly detecting the embedded data. For the example of video images, this represents reducing as far as possible a perceptible degradation of the image, whilst increasing the likelihood of correctly detecting the data.

SUMMARY OF INVENTION

According to the present invention there is provided an image processing apparatus operable to embed data into an image, the apparatus comprising a combining processor operable to introduce the data into a transform domain representation providing a plurality of sub-bands divided by spatial frequency components, and, in combination with a transform processor, to combine the data with the image in one of a transform domain form, the transform processor generating a transform domain form of the image, the data being combined with the image by the combining processor in the transform domain, and the transform processor generating a spatial domain representation of the combined image and data, or a spatial domain form of the image, the transform processor generating a spatial domain representation of the transform domain data, the data being combined with the image by the combining processor in the spatial domain, wherein the data is introduce into at least one of the sub-bands in a scan direction, the at least one sub-band representing in the transform domain low spatial frequencies of the image in one direction and high spatial frequencies of the image in another direction, the scan direction being in the same direction in the sub-band as the direction of the low spatial frequencies of the image.

The expression scan direction is used to indicate a relative direction in which the data to be embedded is introduced into the sub-band. This should not be interpreted as implying any particular order in which the data to be embedded is introduced into the sub-band, but is an expression which is used to indicate a relative direction in which data is introduced into the sub-band.

In a transform domain representation of a typical image the sub-bands representing in the transform domain low spatial frequencies of the image in one direction and high spatial frequencies of the image in another direction generally have lower energy in the spatial direction corresponding to the low spatial frequencies. As such, by introducing the data into the sub-band in the same direction as that of the low spatial frequencies of the image, the data will be embedded in lower energy transform domain components of the image. This has an advantage of improving the likelihood of correctly detecting the embedded data which will be detected in the presence of the image, and correspondingly as a result of the improved detection likelihood, the energy of the embedded data signal can be reduced, thereby reducing any possible visual impairments to the image in the spatial domain. Preferably, the direction of the low spatial frequencies in the sub-band is orthogonal to the other direction of the high spatial frequencies.

Writing the embedded data in the same direction in the sub-band as the orientation of the low frequency spatial components can be thought of as improving the signal-to-noise ratio for detecting the embedded data. The embedded data can be considered as the signal and the transform domain image data as noise. An improvement in the signal to noise ratio for detecting the embedded data is provided because the image is effectively noise with respect to the detection of the embedded data, and the embedded data is the signal. As such, writing the data in the same direction as the low energy components of the image provides an improvement in the probability of correctly detecting the embedded data as a result of the improvement in the signal to noise ratio. Furthermore, because the data is written in the same direction as the lower energy component of the image, the strength of the embedded data can be reduced thereby reducing any disturbance to the underlying image.

Although it will be appreciated that any appropriate transform can be used to embed the data into the image in the transform domain, in preferred embodiments, the transform is the discrete wavelet transform, the data symbols in each of the sub-bands comprising wavelet coefficients, each symbol of the modulated data being added to the wavelet coefficients.

In preferred embodiments, the data is embedded in a first low vertical, high horizontal spatial frequencies sub-band, and a second high vertical, low horizontal spatial frequencies sub-band, the data being added to the first and second sub-bands in the vertical and the horizontal directions respectively. Data is embedded only in the two sub-bands with low vertical, high horizontal spatial frequencies, and high vertical, low horizontal spatial frequencies sub-bands, because this provides an improved likelihood of detecting the embedded data, whilst reducing the effects that the embedded data will have on the resulting image. Transform domain data from the high horizontal, high vertical frequencies sub-band is more likely to be lost or at least disturbed, if the image is compression encoded at some point before the embedded data is detected and recovered. For compression encoding processes, such as for example JPEG encoding, the high frequency components of the image are generally discarded or at least reduced. Therefore, writing the data into this high vertical, high horizontal frequencies sub-band would reduce the likelihood of being able to recover the embedded data. Conversely, data is also not written into the low vertical frequencies, low horizontal frequencies sub-band. This is because writing data into this sub-band would have a more disturbing effect on the image, because the eye is more sensitive lower frequency components and so alterations in this sub-band are more noticeable. Therefore adding the data into the low vertical frequencies, low horizontal frequencies sub-band would have a more visually disturbing effect on the image. As a compromise the data is added into the high horizontal, low vertical frequencies sub-band and the low horizontal, high vertical frequencies sub-bands.

Various further aspects and features of the present invention are defined in the appended claims.

BRIEF DESCRIPTION OF THE DRAWINGS

FIG. 3 is a schematic representation illustrating the form of the wavelet domain transform;

FIG. 4 is a schematic representation of an iterative filtering process which can be used to form the wavelet transform;

DESCRIPTION OF PREFERRED EMBODIMENT

An example embodiment of the present invention will be described with reference to a watermarking system in which data is embedded into a video image. Any type of data can be embedded into the image. However, advantageously the data embedded into the image may be meta data which describes the image or identifies some attributes of the content of the image itself. An example of meta data is the Universal Material Identifier (UMID). A proposed structure for the UMID is disclosed in SMPTE Journal March 2000. A more detailed explanation of the structure of the UMID will be described later.

Watermarking System

Figure 1:
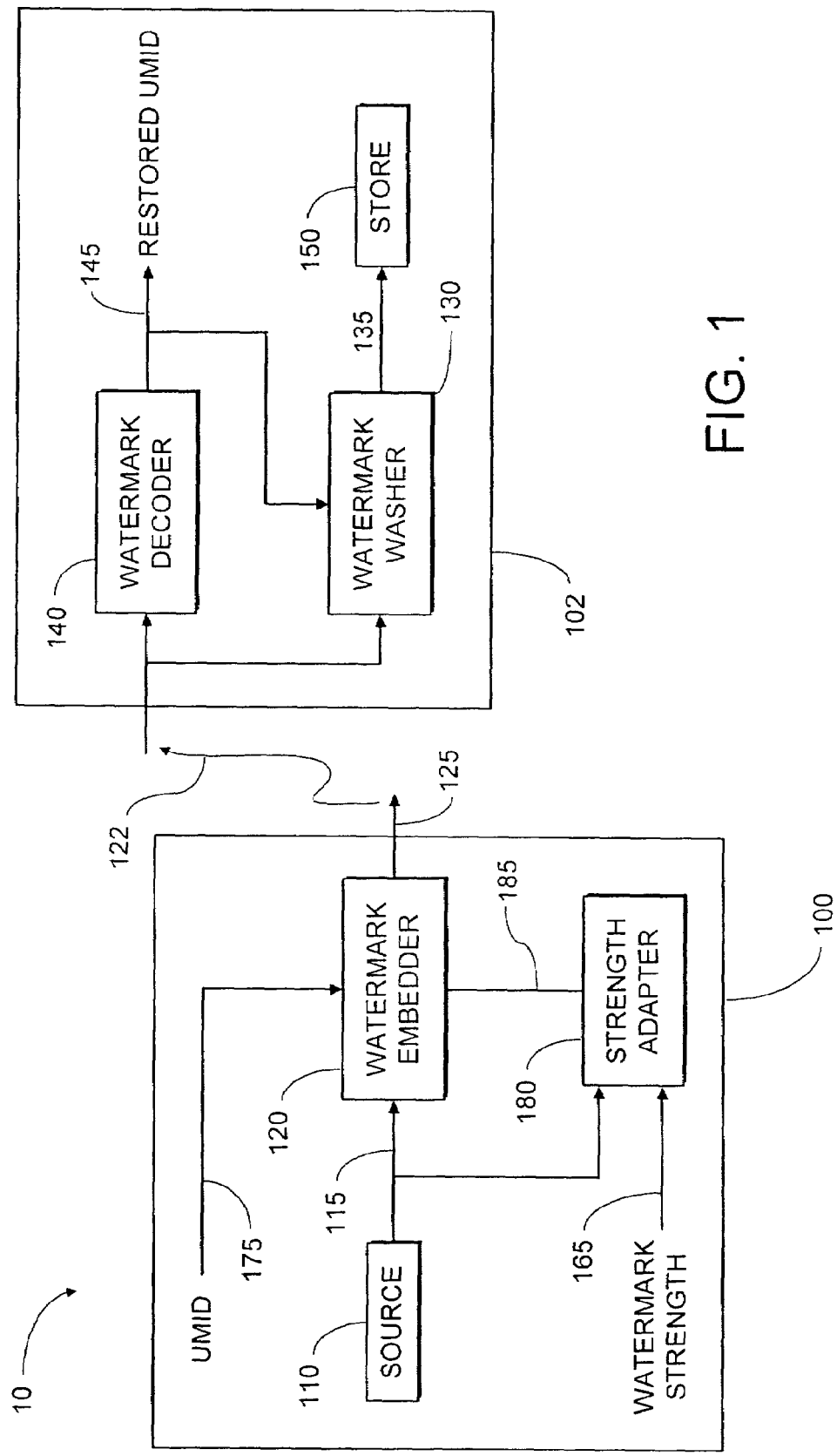
FIG. 1 is a schematic block diagram of a watermarking system.

FIG. 1 illustrates a watermarking system, generally 10, for embedding a watermark into a video image 115, and recovering and removing a watermark from the video image 115. The watermarking system 10 in FIG. 1 comprises an image processor 100 for embedding the watermark into the video image, and a decoding image processor 102 for detecting and recovering the watermark, and for removing or 'washing' the watermark from the video image.

The image processor 100 for embedding the watermark into the video image comprises a strength adapter 180, and a watermark embedder 120. The watermark embedder 120 is arranged to embed the watermark into the video image 115, produced from the source 110, to form a watermarked image 125. The watermark to be embedded into the video image is formed from data 175 representing a UMID. Generally, the UMID identifies the content of the video image, although it will be appreciated that other types of meta data which identify the content or other attributes of the image can be used to form the watermark. In preferred embodiments the watermark embedder 120 embeds the UMID into the video image 115 in accordance with a particular application strength 185 from the strength adapter 180. The strength adapter 180 determines the magnitude of the watermark in relation to the video image 115, the application strength being determined such that the watermark may be recovered whilst minimising any effects which may be perceivable to a viewer of the watermarked image 125. After embedding the watermark, the image may be transmitted, stored or further processed in some way, such as for example, compression encoding the image. This subsequent processing and transmitting is represented generally in FIG. 1 as line 122.

In FIG. 1 the decoding image processor 102 for detecting and removing the watermark is shown as comprising a watermark decoder 140, a data store 150 and a watermark washer 130 which removes the watermark from the watermarked image 125.

The watermark decoder 140 detects the watermark from the watermarked video image and in the present example embodiment, generates a restored UMID 145 from the watermarked image 125. The watermark washer 130 generates a restored image 135, by removing as far as possible the watermark from the watermarked image 125. In some embodiments, the watermark washer 130 is operable to remove the watermark from the image substantially without leaving a trace. The restored image 125 may then be stored in a store 150, transmitted or routed for further processing.

The Watermark Embedder

Figure 2:
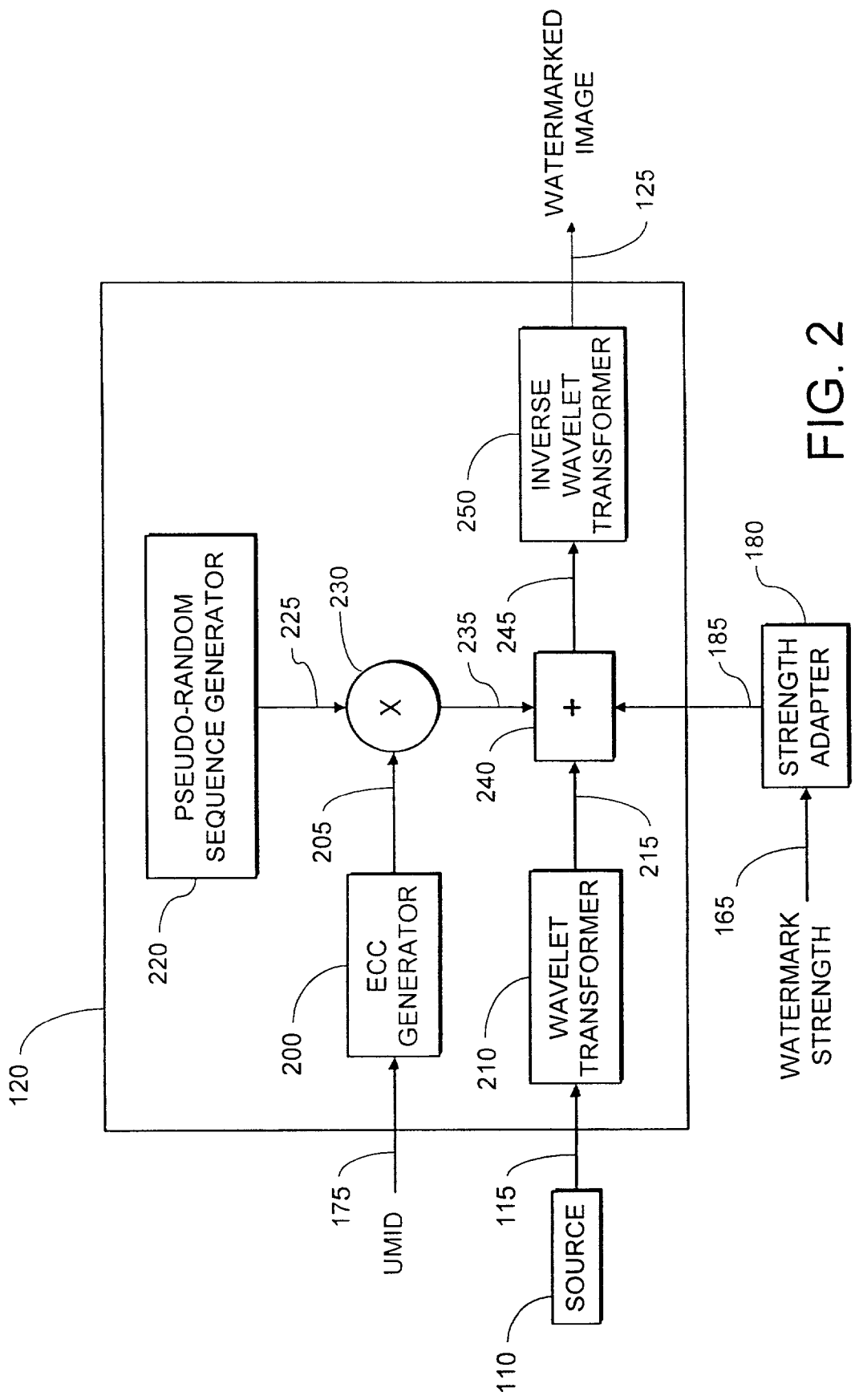
FIG. 2 is a schematic block diagram of a watermark embedder appearing in FIG. 1.

The watermark embedder will now be described in more detail with reference to FIG. 2, where parts also appearing in FIG. 1 have the same numerical references. In FIG. 2 the watermark embedder 120 comprises a pseudo-random sequence generator 220, an error correction encoder 200, a wavelet transformer 210, an inverse wavelet transformer 250, a modulator 230 and a combiner 240.

The error correction encoder 200 receives the UMID 175 and generates aan error correction encoded UMID comprising redundant data in combination with the UMID, in accordance with an error correction encoding scheme. It will be appreciated that various error correction coding schemes could be used to encode the UMID. For the example embodiment the error correction encoder 200 uses a Bose-Chaudhuri-Hocquenghem (BCH) systematic code providing 511 bit code words comprising 248 source bits of the UMID and 263 bits of redundant parity bits.

As shown in FIG. 2 the error correction encoded UMID 205 is received at a first input to the modulator 230. The pseudo-random sequence generator 220 outputs a PRBS 225 which is received at a second input to the modulator 230. The modulator 230 is operable to modulate each copy of a PRBS, generated by the pseudo-random sequence generator 220, with each bit of the error correction encoded UMID. In preferred embodiments the data is modulated by representing the values of each bit of the PRBS in bipolar form ('1' as +1, and '0' as −1) and then reversing the polarity of each bit of the PRBS, if the corresponding bit of the encoded UMID is a '0' and not reversing the polarity if the corresponding bit is a '1'. The modulated PRBS is then received at a first input of the combiner 240. The combiner 240 receives at a second input the image in which the PRBS modulated data is to be embedded. However the data is combined with the image in the transform domain.

The use of a pseudo-random sequence 225 to generate the spread spectrum signal representing the watermark data allows a reduction to be made in the strength of the data to be embedded in the image. By cross-correlating the data in the transform domain image to which the modulated PRBS has been added, a correlation output signal is produced with a so called correlation coding gain which allows the modulated data bit to be detected and determined. As such, the strength of the data added to the image can be reduced, thereby reducing any perceivable effect on the spatial domain image. The use of a spread spectrum signal also provides an inherent improvement in robustness of the image because the data is spread across a larger number of transform domain data symbols.

As shown in FIG. 2, the wavelet transformer 210 receives the video image 115 from the source 110 and outputs a wavelet image 215 to the combiner 240. The image is thus converted from the spatial to the transform domain. The combiner 240 is operable to add the PRBS modulated data to the image in the transform domain, in accordance with the application strength, provided by the strength adapter 180. The watermarked wavelet image 245 is then transformed into the spatial domain by the inverse wavelet transformer 250 to produce the watermarked image 125. The operation of the combiner 240 will be explained in more detail shortly.

In order to explain the embodiment of the present invention a brief description of wavelet transforms will be provided in the following paragraphs with reference to FIGS. 3 and 4.

The Wavelet Transform

Wavelets are well known and are described in for example "A Really Friendly Guide to Wavelets" by C Valens, 1999 (c.valens@mindless.com). Valens shows that the discrete wavelet transform can be implemented as an iterated filter bank, as used in sub-band coding, with scaling of the image by a factor of 2 at each iteration.

Thus, referring to FIG. 3 a spatial domain image is applied to a set of high pass HP and low pass LP filters. At level 1, the first stage of filtering, the image is filtered horizontally and vertically and, in each direction, scaled down by a factor of 2. In level 2, the low pass image from level 1 is filtered and scaled in the same way as in level 1. The filtering and scaling may be repeated in subsequent levels 3 onwards.

The result is shown schematically in FIG. 4. FIG. 4 is a representation normal in the art. The horizontal axis H indicates increasing frequency. At level one the image is spatially filtered into four bands; the lower horizontal and vertical band, $lH_1$, $lV_1$; the upper horizontal band $hH_1$, $lV_1$; the upper vertical band $lH_1$, $hV_1$; and the upper horizontal and vertical band, $hH_1$, $hV_1$. At level 2, the lower horizontal and vertical band, $lH_1$, $lV_1$ is filtered and scaled into the lower horizontal and vertical band, $lH_2$, $lV_2$; the upper horizontal band $hH_2$, $lV_2$; the upper vertical band $lH_2$, $hV_2$; and the upper horizontal and vertical band, $hH_2$, $hV_2$. At level 3 (not shown in FIG. 4), the lower horizontal and vertical band, $lH_2$, $lV_2$ is further filtered and scaled.

Combiner

The operation of the combiner 240 will now be explained in more detail. The combiner 240 receives the wavelet image 215 from the wavelet transformer 210, and the modulated PRBS from the modulator 230 and the application strength 185 from the strength adapter 180. The combiner 240 embeds the watermark 235 onto the wavelet image 215, by adding, for each bit of the modulated PRBS a factor α scaled by ±1, in dependence upon the value of the bit. Predetermined regions of the wavelet image 215 are used to embed the watermark 235. Each pixel of the predetermined region of the wavelet image 215 is encoded according to the following equation:

$$X'_i = X_i + \alpha_n W_i \qquad (1)$$

Where $X'_i$ is the i-th wavelet coefficient, $\alpha_n$ is the strength for the n-th PRBS and $W_n$ is the n-th bit of the watermark to be embedded in bipolar form, which for the example embodiment is the bit of the error correction encoded UMID.

Figure 5:
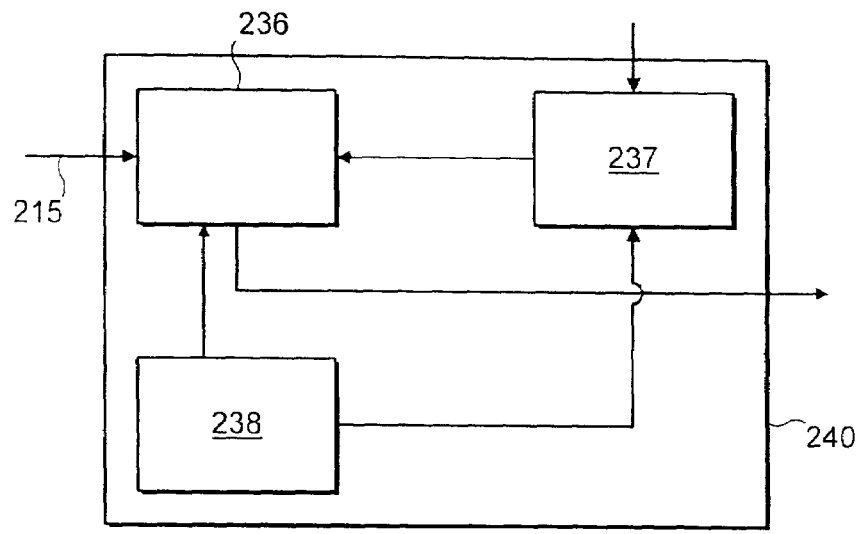
FIG. 5 is a schematic block diagram of a combiner forming part of the watermark embedder shown in FIG. 2.

An example of the combiner and the operation of the combiner will now be described with reference to FIGS. 5 and 6. In FIG. 5 the combiner 240 is shown to receive the transform domain image from the connecting channel 215 which provides the transform domain image to a frame store 236. The frame store 236 is arranged to store a frame of transform domain data. The combiner 240 is also arranged to receive the spread spectrum encoded and error correction encoded UMID after it has been spread using the PRBS (modulated PRBS data). For this example embodiment one UMID in this error correction and spread spectrum encoded form is to be embedded in the frame of image data within the frame store 236. Thus, each encoded UMID forms an item of data which is to be embedded into each frame of image data. To this end, the frame store stores a frame of data representing the image in the wavelet transform domain. The data to be embedded is received at a combining processor 237 which combines the data to be embedded into selected parts of the wavelet transform domain image stored in the frame store 236. The combiner 240 is also provided with a control processor 238 which is coupled to the combining processor 237. As indicated the combiner 240 operates to embed successive items of data which in the present example comprises the encoded UMIDs.

Figure 6:
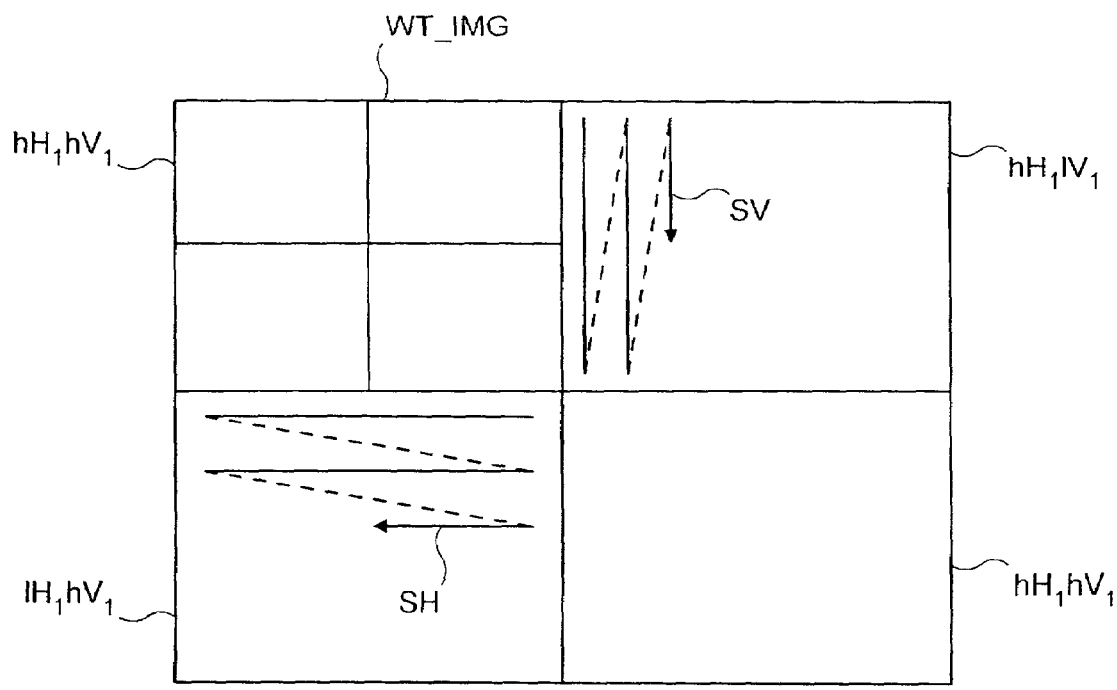
FIG. 6 provides an illustrative representation of the operation of the combiner of FIG. 5.

FIG. 6 provides an illustration of the operation of the combining processor 237 and the control processor 238. In FIG. 6 a wavelet transform image WT_IMG is shown to be divided into four sub-bands in accordance with a first order wavelet transform. Each of the sub-bands of the wavelet transform image WT_IMG is labelled in correspondence with the notation shown in FIG. 3. In the example embodiment of the present invention, the data to be embedded is only written into the low vertical, high horizontal frequencies sub-band $hH_1 lV_1$ and the low horizontal, high vertical frequencies sub-bands labelled $lH_1 hV_1$. The combining processor is operable to add the data item to be embedded into each of these sub-bands in a scan direction which is illustrated by the lines SV and SH. As can be seen in FIG. 6, the scan direction for the low vertical, high horizontal frequencies sub-band $hH_1lV_1$ is a vertical scan line SV. The scan direction for the low horizontal, high vertical frequencies sub-bands labelled $lH_1hV_1$ is a horizontal scan line SH.

By embedding the data in only the two sub-bands $hH_1lV_1$, $lH_1hV_1$, the likelihood of detecting the embedded data is improved whilst the effects that the embedded data will have on the resulting image are reduced. This is because the wavelet coefficients of the high horizontal, high vertical frequencies sub-bands $hH_1hV_1$ are more likely to disturbed, by for example compression encoding. Compression encoding processes such as JPEG (Joint Photographic Experts Group) operate to compression encode images by reducing the high frequency components of the image. Therefore, writing the data into this sub-band $hH_1hV_1$ would reduce the likelihood of being able to recover the embedded data. Conversely, data is also not written into the low vertical, low horizontal frequencies sub-band $lH_1lV_1$. This is because the human eye is more sensitive to the low frequency components of the image. Therefore, writing the data in the low vertical, low horizontal frequencies sub-band would have a more disturbing effect on the image. As a compromise the data is added into the high horizontal, low vertical frequencies sub-band $hH_1lV_1$ and the low horizontal, high vertical frequencies sub-bands $lH_1hV_1$. However in order to increase the likelihood of correctly detecting the embedded data and correspondingly reducing the perceived effects of the embedded data on the image, the data is written into the image into these sub-bands in the same direction as the low frequency components of the image. That is to say, the scan direction SV, SH is in the same direction as the spatial direction of the low frequencies of the wavelet sub-band. As mentioned this provides a particular advantage by increasing the likelihood of correctly detecting the embedded data because the data is being written in a direction which corresponds to the lower energy components of the image. Correspondingly, the strength of the embedded data can be reduced such that the effect on the image in the spatial domain can be reduced.

Although in this example embodiment, the data to be embedded is added to the image in the transform domain, in alternative embodiments the data could be represented in the transform domain, inverse transformed into the spatial domain, and added to the image in the spatial domain.

Decoder

Figure 7:
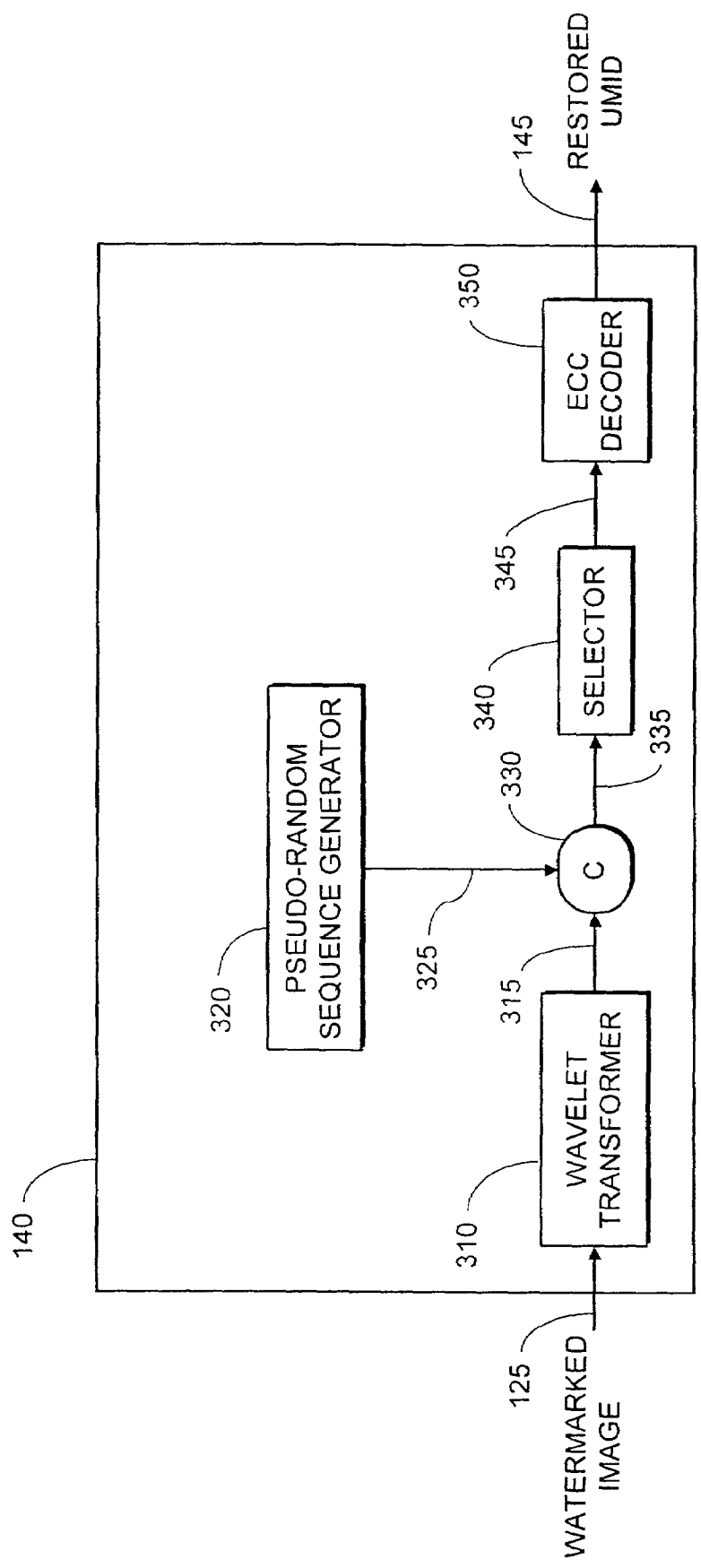
FIG. 7 is a schematic block diagram of a watermark decoder appearing in FIG. 1.

For completeness the operation of the watermark decoder 140 in the decoding image processor, will now be explained in more detail, with reference to FIG. 7, where parts also appearing in FIG. 1, bear identical reference numerals. The watermark decoder 140 receives the watermarked image 125 and outputs a restored version of the UMID 145. The watermark decoder 140 comprises a wavelet transformer 310, a pseudo-random sequence generator 320, a correlator 330, a selector 340 and an error correction decoder 350.

The wavelet transformer 310 converts the watermarked image 125 into the transform domain so that the watermark data can be recovered. The wavelet coefficients to which the PRBS modulated data were added by the combiner 240 are then read from the two wavelet sub-bands $hH_1lV_1$, $lH_1hV_1$ in the same direction to the direction in which the data was added in the combiner 240. These wavelet coefficients are then correlated with respect to the corresponding PRBS used in the watermark embedder. This correlation is expressed as equation (2), below, where $X_n$ is the n-th wavelet coefficient and $R_i$ is the i-th bit of the PRBS generated by the Pseudo Random Sequence Generator 320.

$$C_n = \sum_{i=1}^{s} X_{sn+i} R_i \qquad (2)$$

The relative sign of the result of the correlation Cn then gives an indication of the value of the bit of the embedded data in correspondence with the sign used to represent this bit in the watermark embedder. The data bits recovered in this way represent the error correction encoded UMID which is subsequently decoded by the error correction decoder 350 using a decoding algorithm for the error correction code used by the encoder 200. Having recovered the UMID, the watermark can be removed from the video image by the watermark washer 130, by performing the reverse of the operations performed by the embedder.

The Universal Material Identifier (UMID)

Figure 8A:
FIGS. 8A and 8B are schematic block diagrams of the structure of an extended and a basic UMID respectively.
Figure 8B:
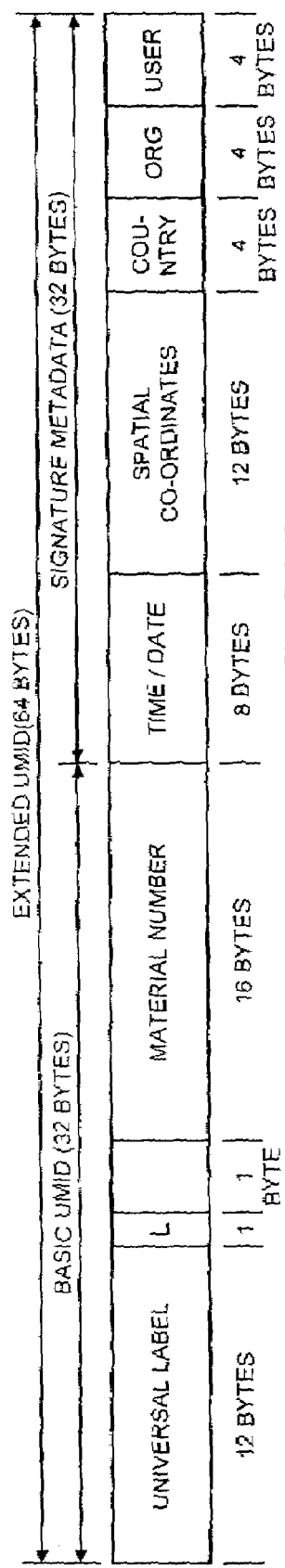

A brief explanation will now be given of the structure of the UMID, with reference to FIGS. 8A and 8B. The UMID is described in SMPTE Journal March 2000. Referring to FIGS. 8A an extended UMID is shown to comprise a first set of 32 bytes of a basic UMID, shown in FIG. 8B and a second set of 32 bytes referred to as signature metadata. Thus the first set of 32 bytes of the extended UMID is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit creation.

A 12-byte value which defines the spatial co-ordinates at the time of Content Unit creation.

3 groups of 4-byte codes which register the country, organisation and user codes.

More explanation of the UMID structure is provided in co-pending UK patent application number 0008432.7.

Various modifications may be made to the embodiments herein before described without departing from the scope of the present invention.

The invention claimed is:

1. An image processing apparatus operable to embed data into an image, said apparatus comprising:

a combining processor operable to form said data into a transform domain representation providing a plurality of sub-bands divided by spatial frequency components, said transform domain representation being the discrete wavelet transform, each of said sub-bands comprising wavelet coefficients and, in combination with a transform processor, to combine said data with said image in a transform domain form, said transform processor generating a transform domain form of said image, said data being combined with said image by said combining processor in said transform domain, said transform processor generating a spatial domain representation of said combined image and data, wherein said data is formed into said sub-bands representing said data in a scan direction, with an effect that said data is embedded in only a first low vertical, high horizontal spatial frequencies sub-band of the discrete wavelet transform, and only a second high vertical, low horizontal spatial frequencies sub-band of the discrete wavelet transform, said data being embedded into to said first and second sub-bands in a vertical scan direction and a horizontal scan direction respectively, symbols of said data being added to the wavelet coefficients, said scan direction being in the same direction in the sub-band as the direction of the low spatial frequencies of the image.

2. An image processing apparatus as claimed in claim 1, wherein said direction of said low spatial frequencies of said at least one sub-band and said another direction of said high spatial frequencies in said at least one sub-band are orthogonal with respect to each other.

3. An image processing apparatus as claimed in claim 1, comprising a modulator operable to modulate a Pseudo Random Symbol Stream with each symbol of the data to be embedded, wherein said combining processor is operable to introduce said modulated Pseudo Random Symbol Stream in said scan direction into said transform domain representation.

4. An image processing apparatus as claimed in claim 1, wherein said data to be embedded in said image is distributed equally between said first and second sub-bands.

5. An image processing apparatus as claimed in claim 1, wherein said data to be embedded is a Universal Material Identifier (UMID).

6. An image processing apparatus as claimed in claim 1, comprising an error correction encoder operable to encode said data to form said data to be embedded.

7. An image processing apparatus as claimed in claim 1, wherein said transform processor is operable to transform said transform domain representation of said data to be embedded into the spatial domain, said combining processor being operable to receive said image in the spatial domain and to combine said image with said spatial domain representation of said embedded data.

8. An image processing apparatus as claimed in claim 1, wherein said transform processor is operable to receive said image in the spatial domain and to transform said image into the transform domain, and said combining processor is operable to combine said transform domain image with the transform domain representation of said data to be embedded, and said transform domain processor is operable to form an inverse transform of said combined transform domain image and data into the spatial domain.

9. An image processing apparatus as claimed in claim 1, wherein said image is a video image.

10. A computer program stored on a computer readable medium providing computer executable instructions, which when loaded on to a data processor configures said data processor to operate as an image processing apparatus as claimed in claim 1.

11. A tangible computer readable medium having recorded thereon the computer program claimed in claim 10.

12. A method of embedding data in an image, said method comprising:

forming said data to be embedded into a transform domain representation corresponding to a spatial domain form of said data, said transform domain representation providing a plurality of sub-bands divided by spatial frequency components, said transform domain representation being the discrete wavelet transform, each of said sub-bands comprising wavelet coefficients; and combining said data with said image by generating a transform domain form of said image, combining said data with said image in the transform domain, and generating a spatial domain representation of said combined image and data, wherein said forming said data into the transform domain representation comprises:

forming said data into said sub-bands in a scan direction, with an effect that said data is embedded in only a first low vertical, high horizontal spatial frequencies sub-band of the discrete wavelet transform, and only a second high vertical, low horizontal spatial frequencies sub-band of the discrete wavelet transform, said data being embedded into to said first and second sub-bands in a vertical scan direction and a horizontal scan direction respectively, symbols of said data being added to the wavelet coefficients, said scan direction being in the same direction in the sub-band as the direction of the low spatial frequencies of the image.

13. A computer program stored on a computer readable medium having computer executable instructions, which when loaded on to a data processor causes the data processor to perform the method according to claim 12.

14. An apparatus for embedding data in an image, said apparatus comprising:

means for forming said data to be embedded into a transform domain representation corresponding to a spatial domain form of said data, said transform domain representation providing a plurality of sub-bands divided by spatial frequency components, said transform domain representation being the discrete wavelet transform, each of said sub-bands comprising wavelet coefficients;

means for combining said data with said image by generating a transform domain form of said image, combining said data with said image in the transform domain, and generating a spatial domain representation of said combined image and data, wherein means for forming said data into the transform domain representation comprises:

means for forming said data into said sub-bands in a scan direction, with an effect that said data is embedded in only a first low vertical, high horizontal spatial frequencies sub-band of the discrete wavelet transform, and only a second high vertical, low horizontal spatial frequencies sub-band of the discrete wavelet transform, said data being embedded into said first and second sub-bands in a vertical scan direction and a horizontal scan direction respectively, symbols of said data being added to the wavelet coefficients, said scan direction being in the same direction in the sub-band as the direction of the low spatial frequencies of the image.

15. An image processing apparatus operable to embed data into an image, said apparatus comprising:

a combining processor operable to form said data into a transform domain representation providing a plurality of sub-bands divided by spatial frequency components, said transform domain representation being the discrete wavelet transform, each of said sub-bands comprising wavelet coefficients and, in combination with a transform processor, to combine said data with said image in a spatial domain form of said image, said transform processor generating a spatial domain representation of said transform domain representation of said data, said data being combined with said image by said combining processor in said spatial domain, wherein said data is formed into said sub-bands representing said data in a scan direction, with an effect that said data is embedded in only a first low vertical, high horizontal spatial frequencies sub-band of the discrete wavelet transform, and only a second high vertical, low horizontal spatial frequencies sub-band of the discrete wavelet transform, said data being embedded into to said first and second sub-bands in a vertical scan direction and a horizontal scan direction respectively, symbols of said data being added to the wavelet coefficients, said scan direction being in the same direction in the sub-band as the direction of the low spatial frequencies of the image.

16. An image processing apparatus as claimed in claim 15, wherein said direction of said low spatial frequencies of said at least one sub-band and said another direction of said high spatial frequencies in said at least one sub-band are orthogonal with respect to each other.

17. An image processing apparatus as claimed in claim 15, comprising a modulator operable to modulate a Pseudo Random Symbol Stream with each symbol of the data to be embedded, wherein said combining processor is operable to introduce said modulated Pseudo Random Symbol Stream in said scan direction into said transform domain representation.

18. An image processing apparatus as claimed in claim 15, wherein said data to be embedded in said image is distributed equally between said first and second sub-bands.

19. An image processing apparatus as claimed in claim 15, wherein said data to be embedded is a Universal Material Identifier (UMID).

20. An image processing apparatus as claimed in claim 15, comprising an error correction encoder operable to encode said data to form said data to be embedded.

21. An image processing apparatus as claimed in claim 15, wherein said transform processor is operable to transform said transform domain representation of said data to be embedded into the spatial domain, said combining processor being operable to receive said image in the spatial domain and to combine said image with said spatial domain representation of said embedded data.

22. An image processing apparatus as claimed in claim 15, wherein said transform processor is operable to receive said image in the spatial domain and to transform said image into the transform domain, and said combining processor is operable to combine said transform domain image with the transform domain representation of said data to be embedded, and said transform domain processor is operable to form an inverse transform of said combined transform domain image and data into the spatial domain.

23. An image processing apparatus as claimed in claim 15, wherein said image is a video image.

24. A computer program stored on a computer readable medium providing computer executable instructions, which when loaded on to a data processor configures said data processor to operate as an image processing apparatus as claimed in claim 15.

25. A method of embedding data in an image, said method comprising:

forming said data to be embedded into a transform domain representation corresponding to a spatial domain form of said data, said transform domain representation providing a plurality of sub-bands divided by spatial frequency components, said transform domain representation being the discrete wavelet transform, each of said sub-bands comprising wavelet coefficients; and combining said data with said image by generating a spatial domain representation of said transform domain representation of said data, and combining said data with said image in said spatial domain, wherein said forming said data into the transform domain representation comprises:

forming said data into said sub-bands in a scan direction, with an effect that said data is embedded in only a first low vertical, high horizontal spatial frequencies sub-band of the discrete wavelet transform, and only a second high vertical, low horizontal spatial frequencies sub-band of the discrete wavelet transform, said data being embedded into to said first and second sub-bands in a vertical scan direction and a horizontal scan direction respectively, symbols of said data being added to the wavelet coefficients, said scan direction being in the same direction in the sub-band as the direction of the low spatial frequencies of the image.

26. A computer program having computer executable instructions, which when loaded on to a data processor causes the data processor to perform the method according to claim 25.

27. A computer program product having a computer readable medium having recorded thereon information signals representative of the computer program claimed in claim 26.

28. An apparatus for embedding data in an image, said apparatus comprising:

means for forming said data to be embedded into a transform domain representation corresponding to a spatial domain form of said data, said transform domain representation providing a plurality of sub-bands divided by spatial frequency components, said transform domain representation being the discrete wavelet transform, each of said sub-bands comprising wavelet coefficients;

means for combining said data with said image by generating a spatial domain representation of said transform domain representation of said data, and combining said data with said image in said spatial domain, wherein means for forming said data into the transform domain representation comprises:

means for forming said data into said sub-bands in a scan direction, with an effect that said data is embedded in only a first low vertical, high horizontal spatial frequencies sub-band of the discrete wavelet transform, and only a second high vertical, low horizontal spatial frequencies sub-band of the discrete wavelet transform, said data being embedded into said first and second sub-bands in a vertical scan direction and a horizontal scan direction respectively, symbols of said data being added to the wavelet coefficients, said scan direction being in the same direction in the sub-band as the direction of the low spatial frequencies of the image.

* * * * *